(12) United States Patent
Muraoka

(10) Patent No.: US 8,102,453 B2
(45) Date of Patent: Jan. 24, 2012

(54) PHOTOELECTRIC CONVERTER

(75) Inventor: Daisuke Muraoka, Chiba (JP)

(73) Assignee: Seiko Instruments Inc., Chiba (JP)

( * ) Notice: Subject to any disclaimer, the term of this patent is extended or adjusted under 35 U.S.C. 154(b) by 477 days.

(21) Appl. No.: 12/471,843

(22) Filed: May 26, 2009

(65) Prior Publication Data

US 2009/0295957 A1 Dec. 3, 2009

(30) Foreign Application Priority Data

May 29, 2008 (JP) .................................. 2008-141095

(51) Int. Cl.
*H04N 3/14* (2006.01)
*H04N 5/335* (2011.01)
(52) U.S. Cl. ........................................ 348/308; 348/294
(58) Field of Classification Search .................. 348/294, 348/308; 257/291, 292; 358/482, 487
See application file for complete search history.

(56) References Cited

U.S. PATENT DOCUMENTS 7,474,346 B2 * 1/2009 Kanai ........................... 348/308
2006/0266932 A1 11/2006 Machida et al.

FOREIGN PATENT DOCUMENTS

JP         2004-282716       10/2004
* cited by examiner

*Primary Examiner* — Alicia M Harrington
(74) *Attorney, Agent, or Firm* — Brinks Hofer Gilson & Lione

(57) ABSTRACT

Provided is a photoelectric converter capable of performing high-speed image reading and resolution switching at the same time. The photoelectric converter includes a plurality of common read lines, and thus parallel output is produced, which enables image reading at high speed. In addition, a photoelectric conversion block (10) is capable of communicating with another photoelectric conversion block (10), whereby the common read lines, to which nodes (E) of a plurality of the photoelectric conversion blocks (10) adjacent to each other are connected, can be made the same. For this reason, voltages of those nodes (E) can be equalized in the same common read line, and hence switching between image resolutions can be realized.

3 Claims, 3 Drawing Sheets

PHOTOELECTRIC CONVERTER

RELATED APPLICATIONS

This application claims priority under 35 U.S.C. §119 to Japanese Patent Application No. JP2008-141095 filed on May 29, 2008, the entire content of which is hereby incorporated by reference.

BACKGROUND OF THE INVENTION

1. Field of the Invention

The present invention relates to a photoelectric converter for converting incident light into an electric signal.

2. Description of the Related Art

An image sensor is used in an image reading apparatus such as a facsimile machine or an image scanner, and in the image sensor, a photoelectric converter is used. In the photoelectric converter, a plurality of photoelectric conversion blocks corresponding to the number of pixels are used. FIG. 5 is a circuit diagram illustrating a conventional photoelectric conversion block.

A photoelectric conversion block 50 includes a signal øR terminal (not shown), a signal øT terminal (not shown), a signal øSCH terminal (not shown), and nodes C to F. In addition, the photoelectric conversion block 50 includes a photoelectric conversion element 51, a reset switch 52, an amplifier 53, a transfer switch 54, a capacitor 55, a driver circuit 56, and a channel selection switch 57. The node E is connected to a common read line (not shown).

A signal øR becomes high, and the reset switch 52 is turned on, whereby an output voltage of the photoelectric conversion element 51 is reset to a reset voltage Vrst. A signal øT becomes high, and the transfer switch 54 is turned on, whereby the reset voltage Vrst before light receiving is amplified by the amplifier 53 and transferred to the capacitor 55 to be stored therein. After the storage, the signal øT becomes low, and thus the transfer switch 54 is turned off. A signal øSCH becomes high, and the channel selection switch 57 is turned on, whereby the output voltage (reset voltage Vrst) of the amplifier 53 before light receiving, which has been stored in the capacitor 55, is read into the common read line.

The photoelectric conversion element 51 in which the output voltage has been reset to the reset voltage Vrst lowers, when receiving incident light, the output voltage according to an amount of the received light. When the photoelectric conversion element 51 receives light for a predetermined period of time, the signal øT becomes high, and thus the transfer switch 54 is turned on. Accordingly, the output voltage after light receiving is amplified by the amplifier 53 and transferred to the capacitor 55 to be stored therein. After the storage, the signal øT becomes low, and thus the transfer switch 54 is turned off. The signal øSCH becomes high, and the channel selection switch 57 is turned on, whereby the output voltage of the amplifier 53 (output voltage of the photoelectric conversion element 51) after light receiving, which has been stored in the capacitor 55, is read into the common read line.

As described above, the photoelectric converter detects a differential voltage between the reset voltage Vrst before light receiving and the output voltage after light receiving, and reads an image (for example, see JP 2004-282716 A).

In recent years, for reading an image at high speed, for example, for reading an image at double speed, in some cases, two common read lines are prepared, and the nodes E of a plurality of the photoelectric conversion blocks 50 are alternately connected to one of the two common read lines and the other thereof, to thereby produce parallel output.

Further, in order to realize switching between image resolutions, for example, in order to perform switching between a resolution of 50% and a resolution of 100%, there are provided two modes in some cases. One is the mode in which the channel selection switches 57 of the plurality of photoelectric conversion blocks 50 are turned on one by one, and the other is the mode in which the channel selection switches 57 are turned on in twos, and voltages of the nodes E of the adjacent two photoelectric conversion blocks 50 are equalized in the same common read line.

However, in the case where high-speed image reading as described above is realized, the common read lines to which the nodes E of the adjacent two photoelectric conversion blocks 50 are connected are different from each other. For this reason, the voltages of those nodes E cannot be equalized in the same common read line, whereby the switching between image resolutions as described above cannot be realized.

SUMMARY OF THE INVENTION

The present invention has been made in view of the above-mentioned problem, and therefore an object thereof is to provide a photoelectric converter capable of performing high-speed image reading and resolution switching at the same time.

In order to solve the above-mentioned problem, the present invention provides a photoelectric converter for converting incident light into an electric signal, including: a plurality of photoelectric conversion blocks each including: a photoelectric conversion element for, when receiving the incident light, changing an output voltage according to an amount of the received incident light; a reset switch for, when being turned on, resetting the output voltage of the photoelectric conversion element to a reset voltage; at least one receiving switch provided for receiving from another photoelectric conversion block a voltage which is obtained according to one of the output voltage of the photoelectric conversion element of the another photoelectric conversion block and the reset voltage; at least one transmitting switch provided for transmitting to the another photoelectric conversion block the voltage which is obtained according to the one of the output voltage of the photoelectric conversion element and the reset voltage; a capacitor for storing the voltage which is obtained according to the one of the output voltage of the photoelectric conversion element and the reset voltage; a transfer switch for, when being turned on, transferring to the capacitor the voltage which is obtained according to the one of the output voltage of the photoelectric conversion element and the reset voltage; and a channel selection switch for, when being turned on, reading the voltage stored in the capacitor into a common read line; a plurality of common control lines for controlling the at least one receiving switch and the at least one transmitting switch of each of the plurality of photoelectric conversion blocks to control a resolution of the photoelectric converter; and a plurality of the common read lines.

According to the present invention, the photoelectric converter includes the plurality of the common read lines, and thus parallel output can be produced correspondingly, which enables image reading at high speed.

Further, the photoelectric conversion block is capable of communicating with another photoelectric conversion block, and thus the common read lines, to which the output terminals of the plurality of photoelectric conversion blocks adjacent to each other are connected, can be made the same. For this reason, outputs of those output terminals can be equalized in the same common read line, and hence switching between image resolutions can be realized.

DETAILED DESCRIPTION OF THE PREFERRED EMBODIMENT

Hereinafter, an embodiment of the present invention is described with reference to the drawings.

Figure 1:
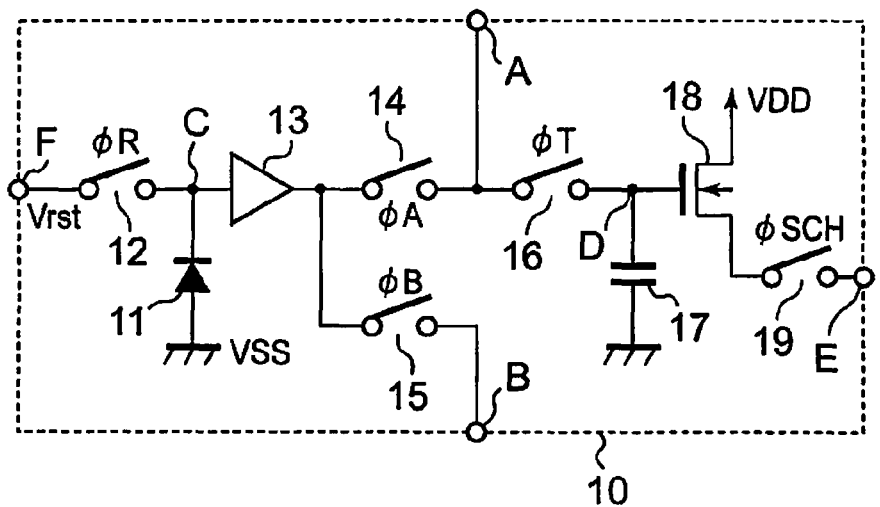
FIG. 1 is a circuit diagram illustrating a photoelectric conversion block including a photodiode according to the present invention.
Figure 2:
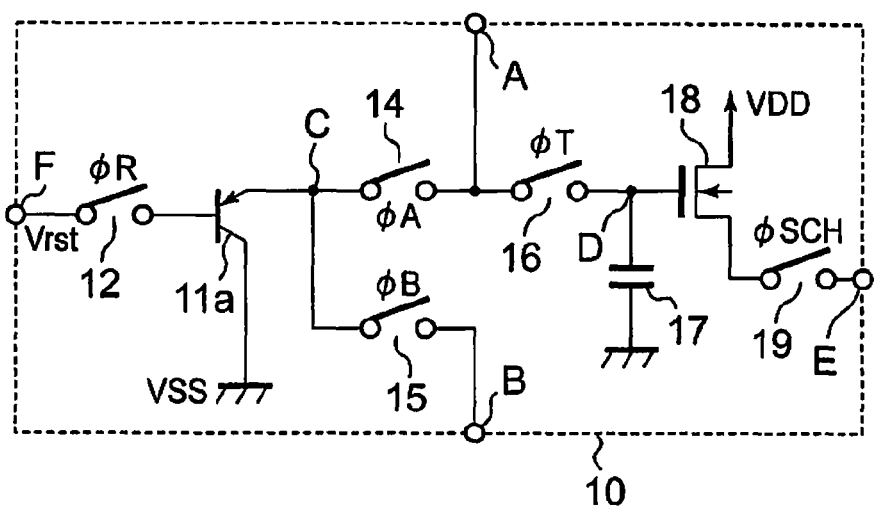
FIG. 2 is a circuit diagram illustrating a photoelectric conversion block including a phototransistor according to the present invention.

First, a configuration of a photoelectric conversion block is described. FIG. 1 is a circuit diagram illustrating a photoelectric conversion block including a photodiode according to the present invention. FIG. 2 is a circuit diagram illustrating a photoelectric conversion block including a phototransistor according to the present invention.

A photoelectric conversion block 10 includes a photoelectric conversion element 11, a reset switch 12, an amplifier 13, a receiving switch 14, a transmitting switch 15, a transfer switch 16, a capacitor 17, a driver circuit 18, and a channel selection switch 19.

The photoelectric conversion element 11 is provided between a node C and a ground terminal. The reset switch 12 is provided between the node C and a node F. The amplifier 13 has an input terminal connected to the node C, and an output terminal which is connected to a node A via the receiving switch 14 and further connected to a node B via the transmitting switch 15. The transfer switch 16 is provided between the node A and a node D. The capacitor 17 is provided between the node D and a node D. The driver circuit 18 has an input terminal connected to the node D and an output terminal connected to a node E via the channel selection switch 19. Note that the node E is connected to one common read line (not shown) or the other common read line (not shown).

The photoelectric conversion element 11 is a photodiode. The photodiode has an anode connected to the ground terminal and a cathode connected to the node C.

Alternatively, the photoelectric conversion element may be a phototransistor 11a as illustrated in FIG. 2. The phototransistor 11a has a base connected to the node F via the reset switch 12, an emitter connected to the node C, and a collector connected to the ground terminal. In this case, the amplifier 13 is not required.

The driver circuit 18 is a source follower circuit, and includes an NMOS transistor. The NMOS transistor has a gate connected to the node D, a source connected to the node E via the channel selection switch 19, and a drain connected to a power supply terminal.

Although not shown, the driver circuit 18 may be a buffer circuit or include an amplifier. The amplifier is buffer-connected.

Next, an operation of the photoelectric conversion block 10 is described.

First, description is given of an operation 1 in the case where a signal øA becomes high, whereby the receiving switch 14 is turned on, and a signal øB becomes low, whereby the transmitting switch 15 is turned off.

A signal øR becomes high, and the reset switch 12 is turned on, whereby an output voltage of the photoelectric conversion element 11 is reset to a reset voltage Vrst. A signal øT becomes high, and the transfer switch 16 is turned on, whereby the reset voltage Vrst before light receiving is amplified by the amplifier 13 and transferred to the capacitor 17 to be stored therein. In addition, the reset voltage Vrst before light receiving is amplified by the amplifier 13 and output from the node A. After the storage, the signal øT becomes low, whereby the transfer switch 16 is turned off. A signal øSCH becomes high, and the channel selection switch 19 is turned on, whereby the output voltage (reset voltage Vrst) of the amplifier 13 before light receiving, which has been stored in the capacitor 17, is read into one common read line or the other common read line.

The photoelectric conversion element 11 in which the output voltage has been reset to the reset voltage Vrst receives incident light, and lowers the output voltage according to an amount of the received light. When the photoelectric conversion element 11 receives light for a predetermined period of time, the signal øT becomes high, and the transfer switch 16 is turned on. Accordingly, the output voltage after light receiving is amplified by the amplifier 13 and transferred to the capacitor 17 to be stored therein. In addition, the output voltage after light receiving is amplified by the amplifier 13 and output from the node A. After the storage, the signal øT becomes low, and the transfer switch 16 is turned off. The signal øSCH becomes high, and the channel selection switch 19 is turned on, whereby the output voltage of the amplifier 13 (output voltage of the photoelectric conversion element 11) after light receiving, which has been stored in the capacitor 17, is read into one common read line or the other common read line.

As described above, the photoelectric converter detects a differential voltage between the reset voltage Vrst before light receiving and the output voltage after light receiving, and performs image reading.

Next, description is given of an operation 2 in the case where the signal øA becomes low, whereby the receiving switch 14 is turned off, and the signal øB becomes high, whereby the transmitting switch 15 is turned on.

The signal øR becomes high, and the reset switch 12 is turned on, whereby the output voltage of the photoelectric conversion element 11 is reset to the reset voltage Vrst. The reset voltage Vrst before light receiving is amplified by the amplifier 13 and output from the node B.

The photoelectric conversion element 11 in which the output voltage has been reset to the reset voltage Vrst receives incident light, and then lowers the output voltage according to an amount of the received light. When the photoelectric conversion element 11 receives light for a predetermined period of time, the output voltage after light receiving is amplified by the amplifier 13 and output from the node B.

Figure 3:
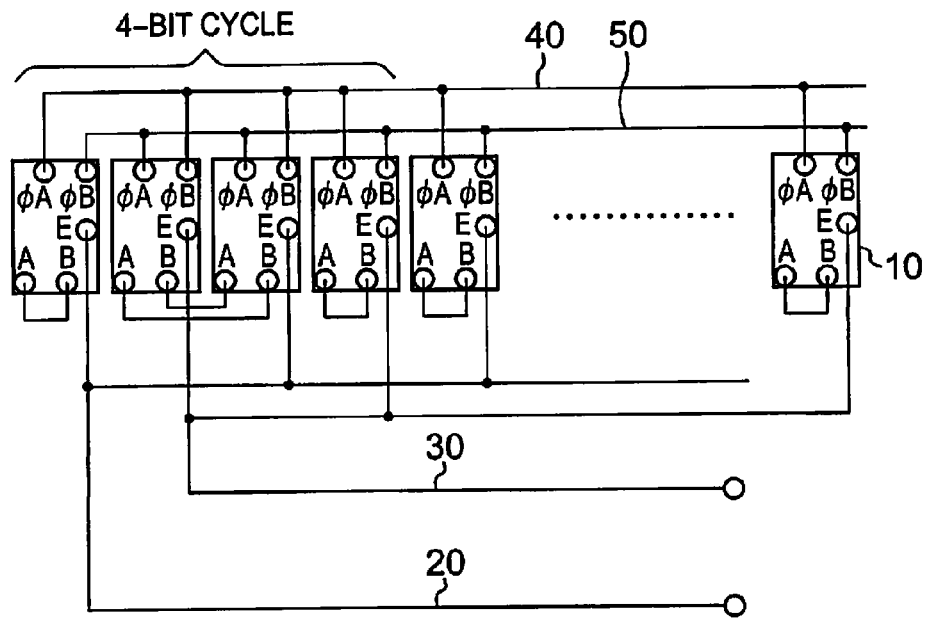
FIG. 3 is a circuit diagram illustrating an example of a photoelectric converter according to the present invention.

Next, a configuration of the photoelectric converter is described. FIG. 3 is a circuit diagram illustrating an example of the photoelectric converter according to the present invention.

The photoelectric converter includes a plurality of the photoelectric conversion blocks 10 corresponding to the number of pixels. In addition, the photoelectric converter includes a common read line 20, a common read line 30, a common control line 40, and a common control line 50. Here, four photoelectric conversion blocks 10 located on a left side of FIG. 3 are referred to as first to fourth photoelectric conversion blocks 10 in order from a left end of FIG. 3.

The first photoelectric conversion block 10 has a signal øA terminal connected to the common control line 40, a signal øB terminal connected to the common control line 50, nodes A and B connected to each other, and a node E connected to the common read line 20. The second photoelectric conversion block 10 has a signal øA terminal connected to the common control line 50, a signal øB terminal connected to the common control line 40, a node A connected to a node B of the third photoelectric conversion block 10, a node B connected to a node A of the third photoelectric conversion block 10, and a node E connected to the common read line 30. The third photoelectric conversion block 10 has a signal øA terminal connected to the common control line 50, a signal øB terminal connected to the common control line 40, and a node E connected to the common read line 20. The fourth photoelectric conversion block 10 has a signal øA terminal connected to the common control line 40, a signal øB terminal connected to the common control line 50, nodes A and B connected to each other, and a node E connected to the common read line 30. The above-mentioned connection status is repeated for all of the plurality of the photoelectric conversion blocks 10.

The turned-off receiving switch 14 and the node A receive the output voltage of the amplifier 13 of the other photoelectric conversion block 10 from the other photoelectric conversion block 10. The turned-on transmitting switch 15 and the node B transmit the output voltage of the amplifier 13 of the relevant photoelectric conversion block 10 to the other photoelectric conversion block 10.

The common control line 40 and the common control line 50 control the receiving switches 14 and the transmitting switches 15 of the plurality of the photoelectric conversion blocks 10, and control a resolution of the photoelectric converter. Specifically, when a voltage of the common control line 40 becomes high and a voltage of the common control line 50 becomes low, the receiving switches 14 are turned off and the transmitting switches 15 are turned on, with the result that the resolution of the photoelectric converter reaches 50%. When the voltage of the common control line 40 becomes low and the voltage of the common control line 50 becomes high, the receiving switches 14 are turned on and the transmitting switches 15 are turned off, with the result that the resolution of the photoelectric converter reaches 100%.

Next, an operation of the photoelectric converter is described.

First, description is given of an operation A in the case where the voltage of the common control line 40 becomes high and the voltage of the common control line 50 becomes low.

In this case, the first and fourth photoelectric conversion blocks 10 perform the above-mentioned operation 1, and the second and third photoelectric conversion blocks 10 perform the above-mentioned operation 2. The signals øSCH of the respective photoelectric conversion blocks 10 are controlled so that the channel selection switches 19 of the respective photoelectric conversion blocks 10 are turned on in fours.

Then, the output voltage of the amplifier 13 of the first photoelectric conversion block 10 is output from the node E of the first photoelectric conversion block 10. In addition, the output voltage of the amplifier 13 of the second photoelectric conversion block 10 is output not from the node E of the second photoelectric conversion block 10 because the receiving switches 14 are turned off, but from the node E of the third photoelectric conversion block 10 because the transmitting switches 15 are turned on. Accordingly, the voltages of the nodes E of the adjacent two first and second photoelectric conversion blocks 10 are equalized in the common read line 20.

Further, the output voltage of the amplifier 13 of the third photoelectric conversion block 10 is output not from the node E of the third photoelectric conversion block 10 because the receiving switches 14 are turned off, but from the node E of the second photoelectric conversion block 10 because the transmitting switches 15 are turned on. Further, the output voltage of the amplifier 13 of the fourth photoelectric conversion block 10 is output from the node E of the fourth photoelectric conversion block 10. Accordingly, the voltages of the nodes E of the adjacent two third and fourth photoelectric conversion blocks 10 are equalized in the common read line 30.

That is, the resolution of the photoelectric converter reaches 50%.

Next, an operation B in the case where the voltage of the common control line 40 becomes low and the voltage of the common control line 50 becomes high is described.

In this case, the first to fourth photoelectric conversion blocks 10 perform the above-mentioned operation 1. The signals øSCH of the respective photoelectric conversion blocks 10 are controlled so that the channel selection switches 19 of the respective photoelectric conversion blocks 10 are turned on in twos.

That is, the resolution of the photoelectric converter is higher compared with the case of the operation A, and reaches 100%.

As described above, the photoelectric converter includes a plurality of common read lines, and thus parallel output is produced correspondingly, which enables image reading at high speed.

Moreover, the photoelectric conversion block 10 can communicate with the other photoelectric conversion block 10, and thus the common read lines, to which the nodes E of the plurality of photoelectric conversion blocks 10 adjacent to each other are connected, can be made the same. As a result, the voltages of those nodes E can be equalized in the same common read line, and hence resolution switching of an image can be realized.

Note that the driver circuit 18 is provided in each of the photoelectric conversion blocks 10, but the driver circuit 18 may be removed. In this case, though not shown, the driver circuit is inserted into the common read line 20 and the common read line 30.

Further, two common read lines are provided and two types of resolutions exist in the description above, but the present invention is not limited thereto. In such a case, circuit design is appropriately made with regard to the numbers of the receiving switches and the transmitting switches which are provided in the photoelectric conversion block 10, and the numbers of the common control lines and the common read lines of the photoelectric converter.

Figure 4:
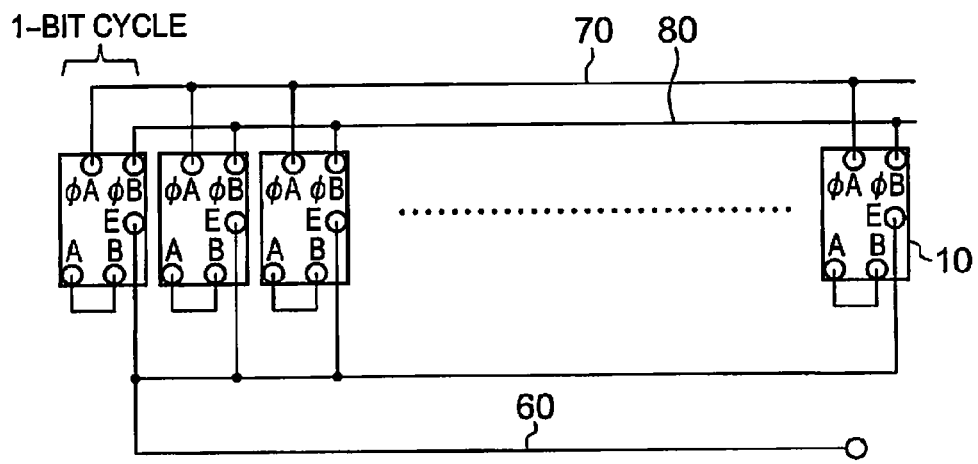
FIG. 4 is a circuit diagram illustrating another example of the photoelectric converter according to the present invention.
Figure 5:
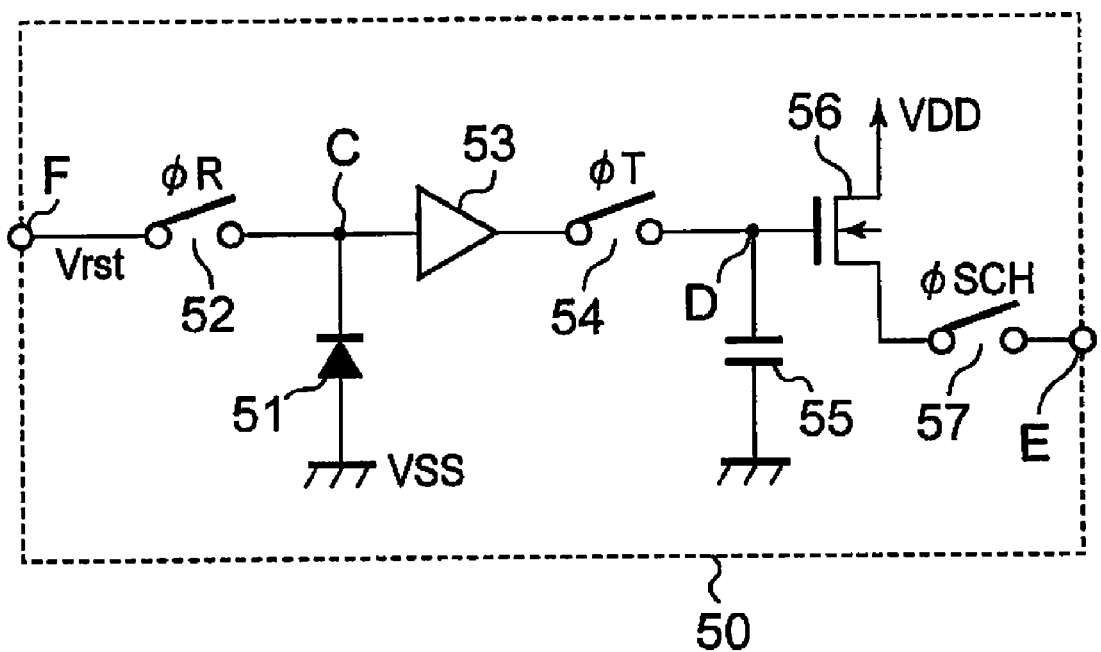
FIG. 5 is a circuit diagram illustrating a conventional photoelectric conversion block.

Further, the nodes E of the plurality of photoelectric conversion blocks 10 are alternately connected to the common read line 20 and the common read line 30 for parallel output. However, as illustrated in FIG. 4, the nodes E may be connected to one common read line for serial output. In such a case, the node A and the node B are connected to each other in each of the photoelectric conversion blocks 10.

Further, the photoelectric converter described above is used in a line image sensor or an area image sensor.

Further, in FIG. 1, the photodiode is provided between the node C and the ground terminal, and the photoelectric conversion element 11 lowers, when receiving incident light, the output voltage according to an amount of the received light. However, though not shown, the photodiode may be provided between the power supply terminal and the node C, and the photoelectric conversion element 11 may raise, when receiving incident light, the output voltage according to an amount of the received light.

Further, in FIG. 2, the phototransistor is provided between the node C and the ground terminal, and the photoelectric conversion element 11a lowers the output voltage according to an amount of the received light when receiving incident light. However, though not shown, the phototransistor may be provided between the power supply terminal and the node C, and the photoelectric conversion element 11a may raise the output voltage according to an amount of the received light when receiving incident light.

What is claimed is:

1. A photoelectric converter for converting incident light into an electric signal, comprising:
    a plurality of photoelectric conversion blocks each comprising:
        a photoelectric conversion element for, when receiving the incident light, changing an output voltage according to an amount of the received incident light;
        a reset switch for, when being turned on, resetting the output voltage of the photoelectric conversion element to a reset voltage;
        at least one receiving switch provided for receiving from another photoelectric conversion block a voltage which is obtained according to one of the output voltage of the photoelectric conversion element of the another photoelectric conversion block and the reset voltage;
        at least one transmitting switch provided for transmitting to the another photoelectric conversion block the voltage which is obtained according to the one of the output voltage of the photoelectric conversion element and the reset voltage;
        a capacitor for storing the voltage which is obtained according to the one of the output voltage of the photoelectric conversion element and the reset voltage;
        a transfer switch for, when being turned on, transferring to the capacitor the voltage which is obtained according to the one of the output voltage of the photoelectric conversion element and the reset voltage; and
        a channel selection switch for, when being turned on, reading the voltage stored in the capacitor into a common read line;
    a plurality of common control lines for controlling the at least one receiving switch and the at least one transmitting switch of each of the plurality of photoelectric conversion blocks to control a resolution of the photoelectric converter; and
    a plurality of the common read lines.

2. A photoelectric converter according to claim 1, wherein the each of the plurality of photoelectric conversion blocks further comprises one of a source follower circuit and a buffer circuit which is provided between the transfer switch and the channel selection switch.

3. A photoelectric converter according to claim 1, further comprising one of a source follower circuit and a buffer circuit which is inserted into each of the plurality of the common read lines.

\* \* \* \* \*